United States Patent Office 3,203,460
Patented Aug. 31, 1965

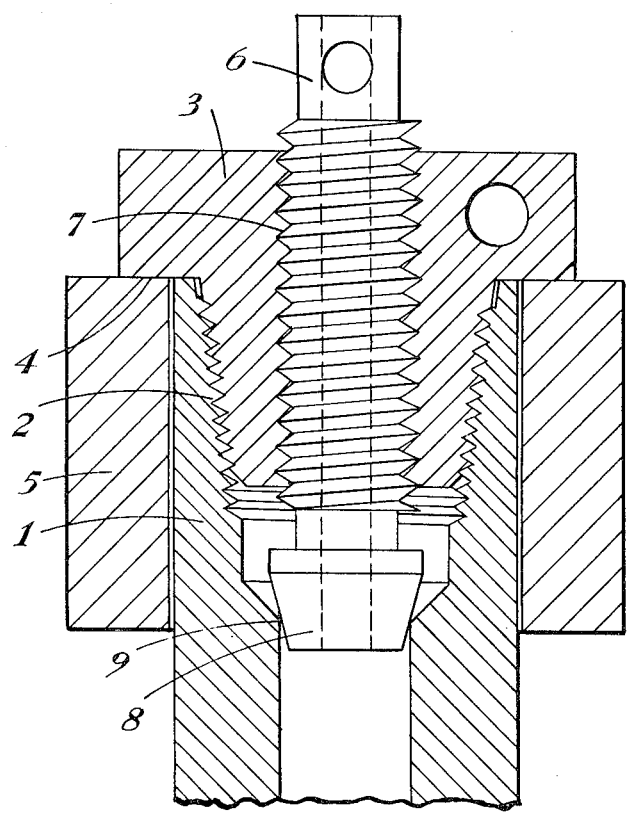

3,203,460
MEANS FOR LOCKING A SCREW-THREADED CONNECTION BETWEEN TWO COMPLEMENTARY SCREW-THREADED MEMBERS
Gerhard Kühne, Holstein, Germany, assignor to Deutsche Erdol-Aktiengesellschaft, Hamburg, Germany, a body corporate of Germany
Filed Oct. 15, 1962, Ser. No. 230,429
Claims priority, application Germany, Oct. 24, 1961,
D 37,306
3 Claims. (Cl. 151—14)

This invention relates to means for locking a screw-threaded connection between two complementary screw-threaded members, and particularly for locking the screw-threaded connections employed between headpieces and drill stems or bore rods used in drilling for petroleum, oil, natural gas and the like. In such operations it is necessary for the drilling tool to be extracted from time to time and replaced when it becomes blunt. Normally the drilling tool is situated at the end of a long length of pipe which is rotated by a machine situated above ground, and in order to facilitate its handling, the length of pipe is made up of a number of individual pipes, usually about 9 metres long. These individual pipes are screwed together with the aid of for example prewelded connectors having special screw-threads. It is these pipes which are known as bore rods. They have a relatively slight wall thickness for the purpose of saving weight, and only the screw-threaded connectors have thick walls for constructional reasons. Generally the connectors have a larger outside diameter than the bore rods so that with the aid of special lifting pieces which engage under this widened portion it is possible to lift the rods without danger of slipping.

At the lower end of the length of piping thick-walled pipes of similar length to the bore rods are inserted which, being heavier than the bore rods, are intended to exert through their weight the necessary drilling pressure on the drilling tool, and at the same time to keep the bore rods situated above them under a certain tension. For this reason their outside diameter is preferably as near as possible to that of the drill hole. It is these pipes which are known as drill stems.

These drill stems are screwed together to form greater lengths in the same manner as the bore rods, and are usually externally smooth, that is to say without external projections or widenings, unlike the ordinary bore rods. In special cases, however, this is also true of the bore rods, so that for the lifting and laying aside of the bore rods or drill stems, which is effected with the aid of a lifting device which embraces the rods or stems, and known as an "elevator," a head piece must be screwed into the upper end of the said rods or stems, the head piece having a greater external diameter than the rods or stems to provide an abutment beneath which the elevator may be engaged.

The screw-threads by which the individual rods or stems are screwed together are almost always in the form of right-hand conical screw-threads. If a bore rod is screwed to the next lower bore rod there is a danger that in consequence of frictional forces exerted on the head piece by the elevator that the head piece will become detached. This may result not only in material damage but also in injuries to personnel. Incomplete detachment may also reduce the carrying capacity of the connection between the head piece and the rod, so that the screw-thread is stripped and the entire length of bore rod drops into the bore hole. In addition to the danger to personnel, incidents of this kind usually cause considerable expense and loss of time.

Hitherto a large number of safety devices have been employed which for example successfully prevent the detachment of a screw or nut, but these devices cannot be used, or can be used only with partial success, for the purpose of the present invention, because they cannot be used repeatedly and as often as desired on the same piece, since they give rise to impermissible deformation of the screw-threads or of the contacting surfaces of the coupling, or make it necessary to modify the latter and require time-consuming and difficult handling operations.

It is the primary object of this invention to provide means for preventing the screw-threaded connection between the head piece and drill stems or bore rods from becoming unintentionally unscrewed, but it is to be understood that the means may equally be applied to other screw threaded connections.

According to this invention means for locking a screw-threaded connection between two complementary screw-threaded members comprises a spindle extending axially through one member and having a screw-thread for engagement with a complementary screw-threaded passage in the said member, the screw thread of the spindle having a greater pitch than the screw threads between the two members, the spindle having an abutment arranged frictionally to engage against the other member to prevent rotation thereof relative to the first mentioned member. The invention is described below with reference to the accompanying drawing which is a longitudinal section of the connection between a head piece and a bore rod.

Referring to the drawing, the upper end 1 of a bore rod has a screw-threaded recess 2 to receive a complementary screw thread portion of a head piece 3 and which, after removal of the head piece, is intended to be screwed to the threaded end of the next rod. The head piece 3 has an annular surface 4 making contact with an elevator 5 which is only partly indicated in the drawing and which is used to position or remove the bore rods in or from the bore hole, the elevator being suspended from a crane (not shown).

In order that when the rod 1 rotates the screw-thread 2 cannot be detached in consequence of friction at the surface 4 of the head piece which contacts the stationary elevator 5, a screw-threaded spindle 6, which for practical reasons is bored hollow, is screwed concentrically into an axial complementary screw-threaded passage 7 in the head piece 3. It is essential that the screw-thread of the spindle 6 and passage 7 should have a greater pitch than the main screw-thread 2.

As shown, the spindle is provided with a substantially conical abutment 8 arranged for engagement with a shoulder 9 in the bore of the bore rod, which shoulder serves as a seating for the abutment.

If the head piece 3 is first screwed to the bore rod 1 without any considerable force being applied and then the spindle 6 is screwed down so that the abutment 8 bears against the shoulder 9, then when it is attempted to unscrew the main screw-thread 2, the spindle 6 held fast by frictional engagement between its abutment 8 and the shoulder 9 will be pressed still more firmly against the shoulder because the pitch of the screw-threads of the spindle and passage 7 is greater than the pitch of the screw threads of the head piece and bore rod. The screw-threads are thus clamped against one another in accordance with the difference in their pitches, so that the connection between the head piece and bore rod is self-locking and can be released only when the spindle 6 is withdrawn to disengage its abutment from the shoulder 9. Unintentional detachment of the head piece is thus impossible, so that the bore rod 1 can, without danger, be screwed to the next lower rod by means of its screw-thread at its lower end.

Although the present invention has been particularly described in relation with a head piece for a bore rod, it is to be understood as already indicated that it is equally applicable to the screw threaded connection between a head piece and a drill stem, or for that matter to any appropriate connection between two complementary screw threaded members.

What is claimed is:

1. Means for locking a screw-threaded connection between a first and second member having complementary screw threads, the first member having a screw threaded passage extending axially therethrough and having an annular contact surface of greater external diameter than said screw-threaded passage, and said second member being contactable with said annular contact surface, said means comprising a screw-threaded spindle in said passage and having screw-threaded engagement solely with said first member, an abutment on said spindle, means to turn said spindle to force said abutment into frictional engagement with the second member to prevent rotation thereof relative to the first member, the complementary screw threads of said passage and spindle being of greater pitch than the complementary screw threads between the said first and second members, attempted unscrewing of said first member from said second member while said abutment is in frictional engagement with said second member and said annular contact surface is in contact with said second member so increasing the pressure between said complementary screw threads as to prevent effective unscrewing of said first member.

2. Means for locking a screw-thread connection between a first and second member having complementary screw threads, the first member having a screw-threaded passage extending axially therethrough and having an annular contact surface of greater external diameter than said screw-threaded passage, and said second member being contactable with said annular contact surface, said means comprising a screw-threaded spindle in said passage and having screw-threaded engagement solely with said first member, a substantially conical abutment on said spindle, a seating on said second member, means to turn said spindle to force said abutment into frictional engagement with the seating to prevent rotation thereof relative to the first member, the complementary screw threads of said passage and spindle being of greater pitch than the complementary screw threads between the said first and second members, attempted unscrewing of said first member from said second member while said abutment is in frictional engagement with said seating and said annular contact surface is in contact with said second member so increasing the pressure between said complementary screw threads as to prevent effective unscrewing of said first member.

3. Means for locking a screw-threaded connection between a head piece and a bore rod having complementary screw threads, the head piece having a concentric screw-threaded bore and having an annular contact surface of greater external diameter than said screw-threaded bore, and said bore rod being contactable with said annular contact surface, said means comprising a spindle in said screw-threaded bore having screw threads complementary to the bore screw threads, an abutment on said spindle, a seating in said bore rod, means for turning said spindle to force the said abutment against said seating so as frictionally to engage said seating to prevent rotation of said bore rod relative to said head piece, the pitch of the complementary screw threads of said spindle and bore being greater than that of the screw-threaded connection between the said head piece and bore rod, attempted unscrewing of said head piece from said bore rod while said abutment is in frictional engagement with said seating and said annular contact surface is in contact with said bore rod so increasing the pressure between said complementary screw threads as to prevent effective unscrewing of said head piece.

References Cited by the Examiner

UNITED STATES PATENTS

| 268,607 | 12/82 | Bell | 151—14 |
| 1,045,094 | 11/12 | Mueller | 251—225 |
| 1,490,445 | 4/24 | Wilson | 294—90 |
| 2,336,173 | 12/43 | Henderson | 251—225 |

FOREIGN PATENTS

| 557,303 | 8/23 | France. |
| 1,266 | 9/08 | Great Britain. |

LEWIS J. LENNY, *Primary Examiner.*

EDWARD V. BENHAM, *Examiner.*